United States Patent
Ona et al.

(10) Patent No.: US 10,495,238 B2
(45) Date of Patent: Dec. 3, 2019

(54) FLUID SEALING DEVICE AND POWER CABLE LINE

(71) Applicant: SUMITOMO ELECTRIC INDUSTRIES, LTD., Osaka (JP)

(72) Inventors: Satoshi Ona, Osaka (JP); Shoji Mashio, Tokyo (JP); Yasuo Sakaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 21 days.

(21) Appl. No.: 15/876,612

(22) Filed: Jan. 22, 2018

(65) Prior Publication Data

US 2018/0216757 A1 Aug. 2, 2018

(30) Foreign Application Priority Data

Jan. 30, 2017 (JP) .................................. 2017-014905

(51) Int. Cl.
| | |
|---|---|
| *F16L 5/06* | (2006.01) |
| *H02G 3/04* | (2006.01) |
| *F16J 15/06* | (2006.01) |
| *H02G 3/22* | (2006.01) |
| *H02G 15/013* | (2006.01) |
| *H02G 9/06* | (2006.01) |

(52) U.S. Cl.
CPC ............... *F16L 5/06* (2013.01); *F16J 15/062* (2013.01); *H02G 3/0481* (2013.01); *H02G 3/22* (2013.01); *H02G 9/06* (2013.01); *H02G 15/013* (2013.01)

(58) Field of Classification Search
CPC ...... H01R 4/70; H01R 9/0521; H02G 15/013; H02G 15/076; H02G 3/088; H02G 3/22; H02G 9/06
USPC ........................................................ 198/861.2
See application file for complete search history.

(56) References Cited

U.S. PATENT DOCUMENTS

| 4,107,456 A | * | 8/1978 | Schuster | G21C 17/116 174/11 R |
|---|---|---|---|---|
| 5,425,171 A | * | 6/1995 | Kroger | H01R 13/424 174/89 |
| 5,998,736 A | * | 12/1999 | Rumsey | H01R 13/53 174/84 R |
| 6,041,858 A | * | 3/2000 | Arizmendi | E21B 33/1208 166/187 |

(Continued)

FOREIGN PATENT DOCUMENTS

JP 2008-167607 7/2008

*Primary Examiner* — Nicholas L Foster
*Assistant Examiner* — L. Susmitha Koneru
(74) *Attorney, Agent, or Firm* — IPUSA, PLLC (57) ABSTRACT

A fluid sealing device for sealing an opening of an installation pipe in which at least a long object is installed includes: a flange configured to close the opening of the installation pipe, the flange having a hole through which the long object is made to pass, and the flange having a stop face that is continuous with and at an angle to an inner surface of the hole; one or more sealing members configured to be disposed on an outer periphery of the long object and configured to exert an urging force toward an axial center of the long object upon being compressed in an axial direction of the long object, thereby sealing a gap between the flange and the long object; and a clamping member configured to press the one or more sealing members toward the stop face.

8 Claims, 8 Drawing Sheets

(56) References Cited

U.S. PATENT DOCUMENTS

| | | | | |
|---|---|---|---|---|
| 8,586,867 | B2* | 11/2013 | Coles, III | E21B 17/003 |
| | | | | 174/74 R |
| 2004/0069522 | A1* | 4/2004 | Jackson | H02G 3/065 |
| | | | | 174/660 |
| 2004/0074662 | A1* | 4/2004 | Hand | H02G 3/0666 |
| | | | | 174/667 |
| 2006/0021784 | A1* | 2/2006 | Garmong | H05K 9/0001 |
| | | | | 174/100 |
| 2007/0125569 | A1* | 6/2007 | Marszalek | H01R 13/6275 |
| | | | | 174/84 R |
| 2011/0132661 | A1* | 6/2011 | Harmason | H01R 4/70 |
| | | | | 174/84 R |
| 2012/0217041 | A1* | 8/2012 | Agusa | B60R 16/0222 |
| | | | | 174/153 G |

* cited by examiner

FLUID SEALING DEVICE AND POWER CABLE LINE

BACKGROUND OF THE INVENTION

1. Field of the Invention

The disclosures herein relate to a fluid sealing device and a power cable line.

2. Description of the Related Art

Patent Document 1 discloses a pipe opening waterproof device that prevents water entering a pipe having a cable installed therein from flowing into a manhole through the pipe. This pipe opening waterproof device includes a sleeve attached to the outer surface of the cable near the pipe opening via a waterproof sealing agent and a flexible waterproof member closing the gap between the sleeve and the pipe opening.

In Patent Document 1, the cable and the sleeve are secured to each other by the waterproof sealing agent. The waterproof sealing agent stiffens over time, which gives rise to a risk of being broken by failing to follow the movement of the cable when the cable is displaced by a large amount in the longitudinal direction. The breaking of the waterproof sealing agent results in a failure to seal the pipe opening. It is thus desirable to provide a structure capable of sealing the opening of an installation pipe even when a long object such as a cable installed in the installation pipe such as a pipe line is displaced by a large amount.

It may thus be desirable to provide a fluid sealing device that is capable of allowing the sliding movement of a long object installed in an installment pipe while maintaining the seal of the opening of the installation pipe in conformity with displacement of the long object in the longitudinal direction. It may also be desirable to provide a power cable line capable of sealing the opening of an installation pipe.

RELATED-ART DOCUMENTS

Patent Document

[Patent Document 1] Japanese Patent Application Publication No. 2008-167607

SUMMARY OF THE INVENTION

According to an embodiment, a fluid sealing device for sealing an opening of an installation pipe in which at least a long object is installed includes: a flange configured to close the opening of the installation pipe, the flange having a hole through which the long object is made to pass, and the flange having a stop face that is continuous with and at an angle to an inner surface of the hole; one or more sealing members configured to be disposed on an outer periphery of the long object and configured to exert an urging force toward an axial center of the long object upon being compressed in an axial direction of the long object, thereby sealing a gap between the flange and the long object; and a clamping member configured to press the one or more sealing members toward the stop face.

According to an embodiment, a power cable line includes a long object having a cable core contained therein, an installation pipe having the long object installed therein, and a fluid sealing device that seals an opening of the installation pipe, wherein the fluid sealing device is the above-described fluid sealing device.

According to at least one embodiment, the fluid sealing device is capable of allowing the sliding movement of the long object installed in the installation pipe in conformity with displacement of the long object in the longitudinal direction while maintaining the sealing of the opening of the installation pipe. Further, the power cable line is capable of sealing the opening of the installation pipe.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Description of Embodiments

In the following, embodiments will be listed and described.

(1) A fluid sealing device according to an embodiment for sealing an opening of an installation pipe in which at least a long object is installed includes: a flange configured to close the opening of the installation pipe, the flange having a hole through which the long object is made to pass, and the flange having a stop face that is continuous with and at an angle to an inner surface of the hole; one or more sealing members configured to be disposed on an outer periphery of the long object and configured to exert an urging force toward an axial center of the long object upon being compressed in an axial direction of the long object, thereby sealing a gap between the flange and the long object; and a clamping member configured to press the one or more sealing members toward the stop face.

With the arrangement described above, the urging force exerted upon the sealing members toward the axial center of the long object enables the formation of a reliable seal between the flange and the long object, thereby sealing the opening of the installation pipe. The use of an urging force for sealing allows the long object to slide on the sealing members in conformity with the movement of the long object even when the long object is displaced by a large amount. Long objects include one that exhibits thermal expansion and contraction (especially due to the conduction of electricity) and one that is forced to expand and contract by the one exhibiting thermal expansion and contraction. A long object exhibiting thermal expansion and contraction includes a cable core, a power cable, etc. A long object forced to expand and contract by the long object exhibiting thermal expansion and contraction includes a ground cable and a metal pipe twisted together with the cable core or the power cable, and also includes an installation pipe having the cable core or the power cable installed therein. Allowing the long object to slide serves to seal the opening of the installation pipe and to reduce the risk of damaging the sealing members even when the long object is displaced by a large amount in the longitudinal direction. Because the sealing members are disposed between the stop face of the flange and the clamping member, the sealing members are not displaced from their fixed positions, even when the long object is displaced by a large amount. With this arrangement, even when an excessive pressure builds up inside the pipe line, for example, the sealing members do not become disengaged by such a pressure.

(2) One aspect of the fluid sealing device is such that the flange has an extension part extending toward an outside in the axial direction of the long object and configured to accommodate the one or more sealing members therein.

With the above-noted arrangement, the sealing members are interposed between the extension part and the long object. Compressing the sealing members in the axial direction of the long object by use of the clamping member allows the sealing members receiving a reactive force from the extension part to be readily urged toward the axial center of the long object, which more readily serves to seal the gap between the flange and the long object.

(3) One aspect of the fluid sealing device having the extension part in the flange is such that the extension part has a male thread part formed at a tip thereof, and the clamping member has a female thread part configured to be threadably engaged with the male thread part.

With the above arrangement, fastening with threadable engagement readily urges the sealing members toward the stop face. Further, there is no need to fasten the flange and the clamping member through other members such as bolts, thereby avoiding an increase in the number of components.

(4) One aspect of the fluid sealing device is such that the one or more sealing members have a first side face facing toward the flange and having an inner circumferential edge thereof situated further toward the flange than an outer circumferential edge thereof, and the stop face conforms in shape to the first side face.

With the above-noted arrangement, compressing the sealing members in the axial direction of the long object by use of the clamping member causes the first side face of the sealing members to be pressed toward the axial center of the long object by the stop face, which more readily serves to seal the gap between the flange and the long object.

(5) One aspect of the fluid sealing device further includes one or more pressing members interposed between the one or more sealing members and the clamping member around the outer periphery of the long object, the one or more pressing members configured to press a second side face of the one or more sealing members facing toward the clamping member.

With the above-noted arrangement, compressing the sealing members in the axial direction of the long object by use of the clamping member causes the second side face of the sealing members to be pressed toward the axial center of the long object by the pressing members, which more readily serves to seal the gap between the flange and the long object. The use of the pressing members, which are separate from the clamping member, restricts rotation of the pressing members even when a rotational force is applied to fasten the clamping member. Only a compressing force in the axial direction of the long object is transmitted to the second side face of the sealing members, without transmitting the rotational force.

(6) One aspect of the fluid sealing device having the pressing members is such that the one or more pressing members have an inner circumferential surface such that a gap is created between the inner circumferential surface and an outer circumferential surface of the long object.

This arrangement reduces the risk that a large displacement of the long object in the longitudinal direction causes the long object to slide on the pressing members in the presence of friction. Damage to the long object by the pressing members can thus be made less likely.

(7) One aspect of the fluid sealing device is such that the clamping member has an inner circumferential surface such that a gap is created between the inner circumferential surface and an outer circumferential surface of the long object.

This arrangement reduces the risk that a large displacement of the long object in the longitudinal direction causes the long object to slide on the clamping member in the presence of friction. Damage to the long object by the clamping member can thus be made less likely.

(8) A power cable line according to an embodiment includes a long object having a cable core contained therein, an installation pipe having the long object installed therein, and a fluid sealing device that seals an opening of the installation pipe, wherein the fluid sealing device is the fluid sealing device of any one of (1) through (7) described above.

The power cable line of this embodiment is provided with the fluid sealing device that allows the long object to slide in conformity with the movement of the long object while maintaining the sealing of the opening of the installation pipe when the long object is displaced by a large amount in the longitudinal direction. The opening of the installation pipe can thus be reliably sealed.

(9) One aspect of the power cable line further includes an insulating plate interposed between a periphery of the flange of the fluid sealing device and an end of the installation pipe, and one or more insulating bolts passing through the flange and the insulating plate to fasten the flange and the insulating plate to each other.

With the arrangement described above, the flange and the installation pipe are electrically insulated from each other in the case of the installation pipe being made of metal. Conducting protective current through the installation pipe enables the prevention of metal corrosion.

DETAILS OF EMBODIMENTS

In the following, specific examples of the embodiments will be described with reference to the accompanying drawings. In the drawings, the same reference numbers or characters represent elements having the same names.

First Embodiment

A description will be given of a power cable line 1000 of the first embodiment and a fluid sealing device 1 provided for the power cable line 1000 by referring to FIG. 1 through FIG. 4.

[Power Cable Line]

The power cable line 1000 of the first embodiment includes long objects 100 including power cables 110, an installation pipe 200 having the long object 100 installed therein, and a fluid sealing device 1 capable of sealing an opening 200*o* of the installation pipe 200. In this example, the long objects 100 including three power cables 110 are twisted together to be installed in a pipe line 210. A work pipe 220, having a larger diameter to provide a sufficient space for unfolding the twisted long objects 100, is disposed at the end of the pipe line 210 for the purpose of allowing the long objects 100 to be separately guided from the pipe line 210. Namely, the installation pipe 200 in which the long objects 100 are installed includes the pipe line 210 and the work pipe 220. Each of the pipe line 210 and the work pipe 220 has a flange disposed at the end thereof on the outer side away from the axial center. Bolt holes are formed through the flanges. Bolts inserted through the bolt holes of the two flanges are threadably engaged with nuts, thereby integrating the pipe line 210 and the work pipe 220 into one piece. An O-ring is disposed between the flanges. An anticorrosion layer 212 is directly disposed on the surface of the pipe line 210 of the installation pipe 200. The fluid sealing device 1 is disposed at an opening 220*o* of the work pipe 220 so as to seal an opening 210*o* of the pipe line 210 via the work pipe 220.

Figure 1:
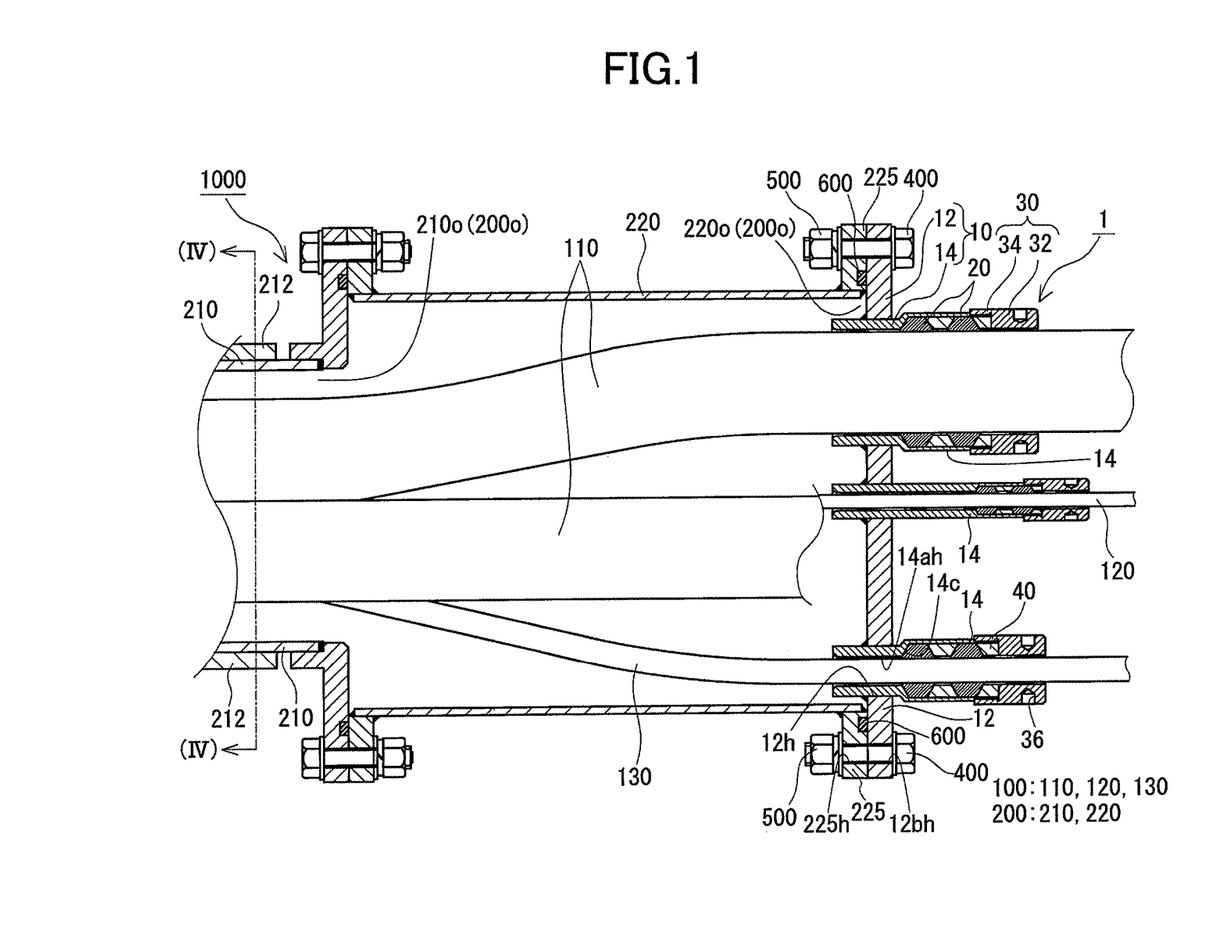
FIG. 1 is a schematic drawing illustrating a fluid sealing device attached to a power cable line according to a first embodiment.
Figure 3:
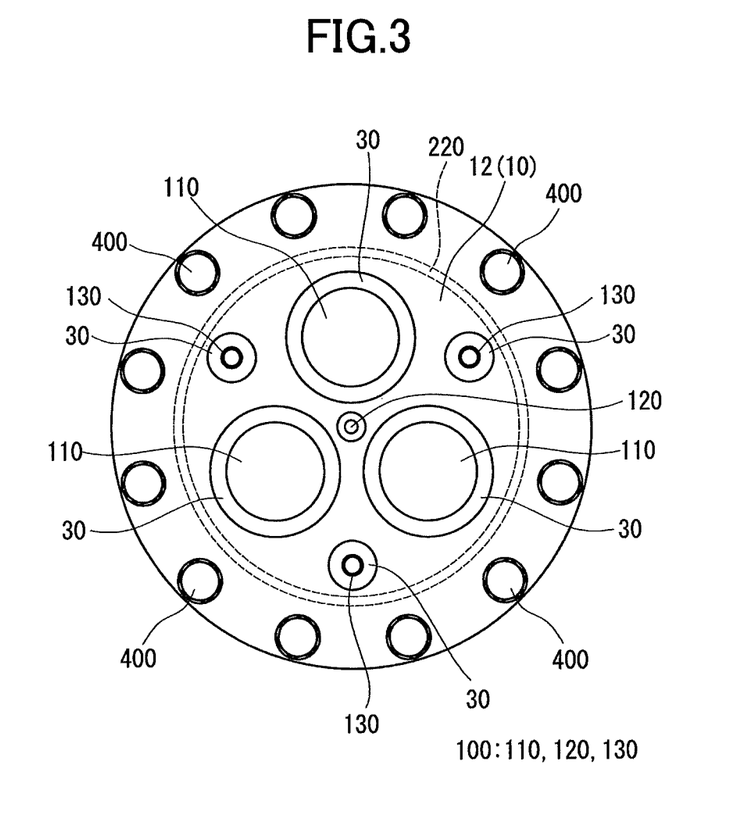
FIG. 3 is a front view of the fluid sealing device attached to the power cable line according to the first embodiment.
Figure 4:
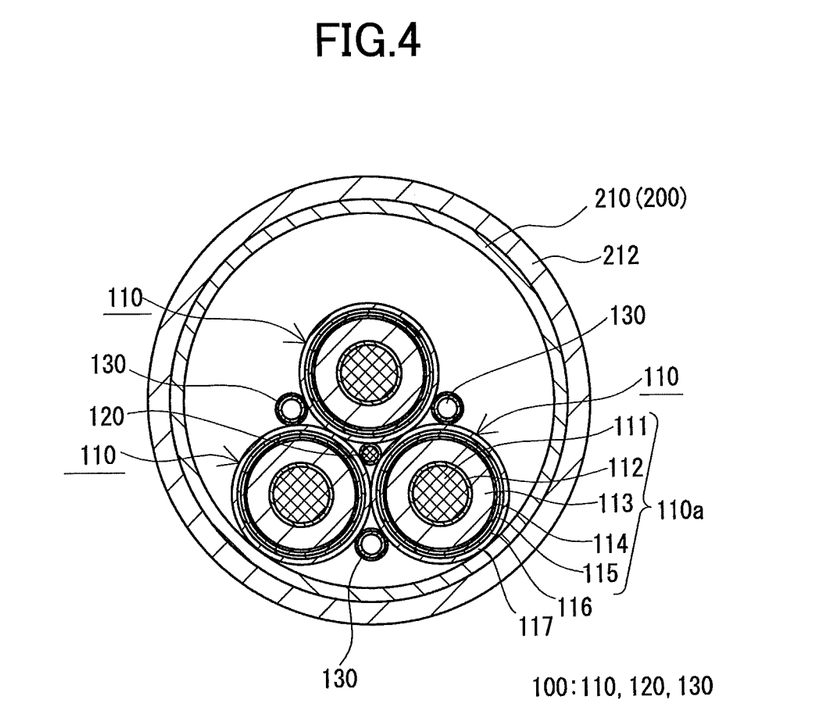
FIG. 4 is a transverse cross-sectional view of long objects and an installation pipe of the power cable line according to the first embodiment.

In the present example, the long objects 100 include the three power cables 110, a ground cable 120, and three metal pipes 130 as illustrated in FIG. 4, all of which are twisted together and installed in the pipe line 210. The long objects 100, which are untwisted in the work pipe 220 as illustrated in FIG. 1 and FIG. 3, are separately guided through a flange 10 (more specifically, a core body 12) of the fluid sealing device 1, which will be described later.

Each of the power cables 110, which has the same configuration, includes a cable core 110*a*, a metal sheath 116 disposed directly on the surface of the cable core 110*a*, and an anticorrosion layer 117 disposed directly on the surface of the metal sheath 116 as illustrated in FIG. 4. The cable core 110*a* includes, from interior to exterior, a conductive body 111, an inner semi-conductive layer 112, an insulating body 113, an outer semi-conductive layer 114, and a bedding tape 115. The basic configuration of the power cables 110 is similar to that of a conventional power cable.

The ground cable 120, which is disposed at the center of the three power cables 110, serves as a tensile strength material for the power cables 110, and also serves as a split conductive path for flowing accidental current occurring at the time of an accident such as a short circuit or a ground fault. The metal pipes 130 serve as a container pipe for storing an optical fiber or the like therein, and also serve as a split conductive path for flowing accidental current occurring at the time of an accident such as a short circuit or a ground fault.

The power cable line 1000 is generally configured such that manholes (not shown) are situated at constant intervals and inserted between the pipe lines 210, and such that the long objects 100 installed in one pipe line 210 and the long objects 100 installed in an adjacent pipe line 210 are connected to each other in a manhole. The fluid sealing device 1 is disposed at the boundary between the pipe line 210 and the manhole. Gases may be enclosed in the pipe line 210 for the purpose of detecting damage to, or avoiding the corrosion of, the pipe line 210. For example, by measuring the pressure level of gases enclosed in the pipe line 210, damage to the pipe line 210 may be detected based on a drop in the gas pressure, for example.

In the power cable line 1000 of the first embodiment, the opening 210*o* of the pipe line 210 (more specifically, the opening 220*o* of the work pipe 220) is sealed by the fluid sealing device 1, which will be described later. In the following, the detailed configuration of the fluid sealing device 1 will be described.

[Fluid Sealing Device]

Figure 2:
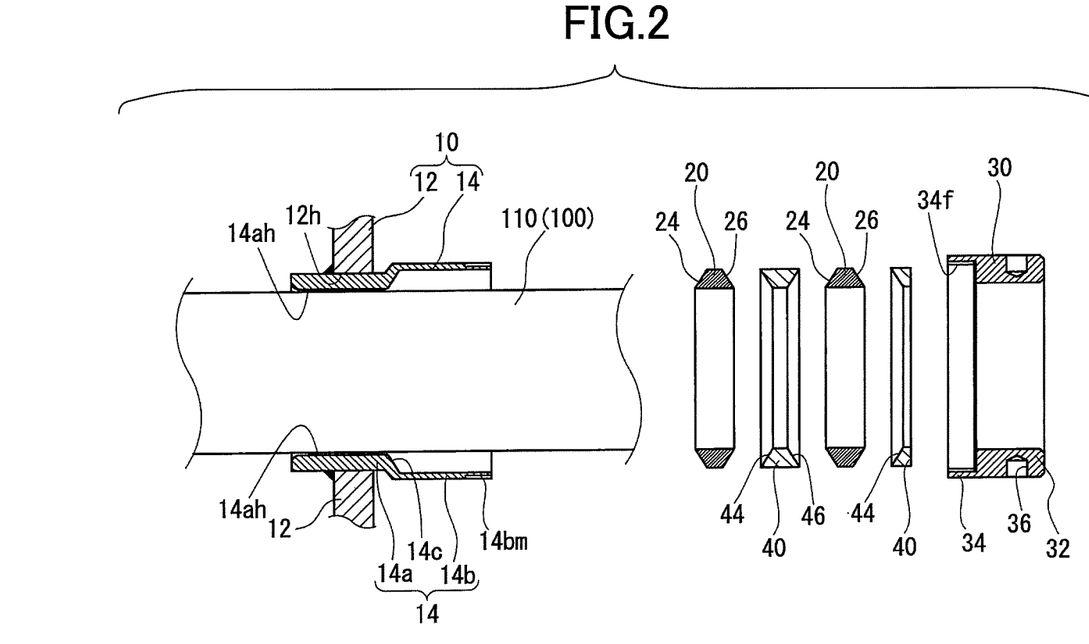
FIG. 2 is a schematic exploded view of the fluid sealing device attached to the power cable line according to the first embodiment.

The fluid sealing device 1 includes the flange 10, sealing members 20, and a clamping member 30 as illustrated in FIG. 1 and FIG. 2. The flange has a through-hole 14*ah* through which a long object 100 of interest extends, and also has a stop face 14*c* that is continuous with and at an angle to the inner surface of the through-hole 14*ah*. The flange 10 closes the opening 220*o* of the work pipe 220 (hence the opening 210*o* of the pipe line 210). The sealing members 20, which are disposed on the outer surface of the long object 100, are compressed in the axial direction of the long object 100, which creates an urging force toward the axial center of the long object 100, thereby sealing the gap between the flange 10 and the long object 100. The clamping member 30 urges the sealing members 20 toward the stop face 14*c* of the flange 10. The fluid sealing device 1 of the first embodiment is configured such that the sealing members 20 are compressed in the axial direction of the long object 100 between the clamping member 30 and the stop face 14*c* of the flange 10 to exert an urging force toward the axial center of the long object 100, thereby sealing the gap between the flange 10 and the long objects 100.

In this example, the fluid sealing device is further configured such that the sealing members 20 have slanted faces, and pressing members 40, having pressing faces 44 and 46 for pressing the slanted face, are used in order to facilitate the generation of an urging force on the sealing members 20 toward the axial center of the long object 100.

<<Flange>>

The flange 10 includes the plate-shaped core body 12 having conduit openings 12*h* through which the long objects 100 pass separately, and includes a cylindrical extension part 14 attached to the inner surface of each of the conduit openings 12*h* and extending toward the outside in the axial direction of the long objects 100. In this example, the core body 12 and the extension part 14 are separate pieces, which may be integrated by welding. The core body 12 and the extension part 14 may alternatively be formed as one continuous piece. The flange 10 is made of the same material as the pipe line 210 and the work pipe 220.

• Core Body

The core body 12 is attached to the end face of the work pipe 220 as illustrated in FIG. 1. In this example, the core body 12 is a steel disk. The end of the work pipe 220 has a projection 225 disposed on the outer side away from the axial center. The projection 225 has bolt holes 225*h* formed at constant intervals in the circumferential direction. The core body 12 has bolt holes 12*bh* formed at the positions corresponding to the bolt holes 225*h* of the projection 225. Bolts 400 are inserted through the bolt holes 225*h* and 12*bh* and threadably engaged with nuts 500, thereby mounting the core body 12 (i.e., the flange 10) to the work pipe 220. An O-ring 600 is disposed between the projection 225 and the core body 12.

The core body 12 has the conduit openings 12h through which the long objects 100 are made to pass separately. The conduit openings 12h, which allow the long objects 100 to pass through, are sized such that a small gap is created between the inner surface of the extension part 14 and the outer surface of the long object 100 when the extension part 14 is mounted as will be described later.

• Extending Part

The extension part 14 is mounted to each of the conduit openings 12h of the core body 12. The extension part 14 includes a small diameter part 14a having an inner diameter slightly larger than the outer diameter of the long object 100, and further includes a large diameter part 14b having an inner diameter larger than that of the small diameter part 14a such that the sealing members 20 and the pressing members 40 can be accommodated between the large diameter part 14b and the long object 100. The extension part 14 is mounted to the core body 12 at the small diameter part 14a. The large diameter part 14b is situated on the opposite side of the core body 12 from where the pipe line 210 (or the work pipe 220) is situated. The stop face 14c is situated at the step formed between the small diameter part 14a and the large diameter part 14b.

The stop face 14c is a slanted surface defining an inner diameter that gradually increases from the small diameter part 14a to the large diameter part 14b. This slanted surface conforms in shape to a side face 24 of the sealing member 20 facing toward the flange (see FIG. 2).

The extension parts 14 provided for the power cables 110 and the metal pipes 130 have a larger difference in the inner diameter between the small diameter part 14a and the large diameter part 14b than do the extension part 14 provided for the ground cable 120. Namely, the extension parts 14 provided for the power cables 110 and the metal pipes 130 are configured such that the height of a space created by the large diameter part 14b for accommodating the sealing members 20 and the pressing members 40 is relatively high, thereby allowing the thickness of the sealing members 20 (i.e., the distance between the inner surface and the outer surface of the sealing members 20) to be relatively thick. This arrangement is made because improved sealing properties are desired due to the fact that, with Joule heat created by large currents flowing through the power cables 110, changes in the currents responsive to load changes create temperature changes, which cause thermal contraction of the power cables 110, and thus make the power cables 110 easier to move in the longitudinal direction thereof. In the case of the metal pipes 130, improved sealing properties are also desired due to the fact that the metal pipes 130 are twisted together with the power cables 110 inside the pipe line 210, which makes the metal pipes 130 readily affected by the movement of the power cables 110 in the longitudinal direction. The extension part 14 provided for the power cables 110 and the metal pipes 130 is configured such that the outer diameter of the large diameter part 14b is larger than the outer diameter of the small diameter part 14a. This arrangement allows the inner diameter of the large diameter part 14b to be made sufficiently large, thereby enabling the accommodation of the thick sealing members 20. In contrast, the ground cable 120 which is disposed at the center of the power cables 110 in the pipe line 210 is not readily affected by the movement of the power cables 110 in the longitudinal direction. The sealing members 20 for the ground cable 120 can thus be properly made thinner than the sealing members 20 provided for the power cables 110 and the metal pipes 130. In consideration of this, the inner diameter of the large diameter part 14b can be made smaller with respect to the extension part 14 provided for the ground cable 120. This allows the outer diameter of the small diameter part 14a and the outer diameter of the large diameter part 14b to be the same to provide a flat outer circumferential surface, thereby allowing the radial size of the extension part 14 to be reduced.

The extension part 14 has a male thread part 14bm formed on the outer circumferential surface of the tip part thereof. The male thread part 14bm is threadably engaged with a female thread part 34f formed on the clamping member 30, which will be described later.

<<Sealing Member>>

The sealing members 20 are annular members disposed around the outer periphery of the long objects 100. As illustrated in FIG. 2, the sealing member 20 has the side face 24 that faces the flange and that has the inner circumferential edge thereof situated further toward the flange 10 than the outer circumferential edge thereof. The sealing member 20 also has a side face 26 that faces the clamping member and that has the inner circumferential edge thereof situated further toward the clamping member 30 than the outer circumferential edge thereof. The side face 24 facing toward the flange is a slanted surface whose distance to the flange 10 gradually decreases from the outer circumferential edge thereof to the inner circumferential edge thereof. Similarly, the side face 26 facing toward the clamping member is a slanted surface whose distance to the clamping member 30 gradually decreases from the outer circumferential edge thereof to the inner circumferential edge thereof. The side face 24 facing the flange and the side face 26 facing the clamping member are slanted at the same angle, which makes the cross-section of the sealing member 20 an isosceles trapezoid. The sealing member 20 exerts an increased sealing strength as the surface area thereof in contact with the long object 100 increases. The provision of the slanted faces of the sealing member 20 allows the surface area of the inner circumferential surface in contact with the long object 100 to be greater than the surface area of the outer circumferential surface. Further, pressing the slanted faces by use of the stop face 14c and the pressing member 40 causes the sealing member 20 to be urged against the long object 100 toward the axial center thereof. The sealing member 20 thus readily seals the gap between the flange 10 and the long object 100.

The sealing member 20 may be configured such that at least one of the side face 26 facing the clamping member and the side face 24 facing the flange is a flat surface extending in the radial direction. Namely, the side face 24 facing the flange may be a slanted surface whose distance to the flange 10 decreases from the outer circumferential edge to the inner circumferential edge while the side face 26 facing the clamping member is a flat surface extending in the radial direction. Alternatively, the side face 24 facing the flange may be a flat surface extending in the radial direction while the side face 26 facing the clamping member is a slanted surface whose distance to the clamping member 30 decreases from the outer circumferential edge to the inner circumferential edge. Alternatively, the sealing member 20 may be configured such that the side face 24 facing the flange and the side face 26 facing the clamping member are both flat surfaces extending in the radial direction.

In this example, two sealing members 20 are used. These two sealing members 20 are disposed between the flange 10 and the clamping member 30 together with the pressing members 40. More specifically, a sealing member 20, a pressing member 40, another sealing member 20, and another pressing member 40 are arranged in this order from the side closer to the flange 10 between the flange 10 and the clamping member 30. One of the two sealing members 20 situated closer to the flange 10 has the side face 24 facing the flange that conforms in shape to the stop face 14c as illustrated in FIG. 2, so that the stop face 14c urges the sealing member against the long object 100 toward to axial center. Further, the sealing member 20 situated closer to the flange 10 has the side face 26, which faces the clamping member, that conforms in shape to the pressing face 44 of the pressing member 40. With this arrangement, the sealing member 20 is urged by the pressing face 44 toward the axial center of the long object 100. One of the two sealing members 20 situated closer to the clamping member 30 has the side face 24 facing the flange that conforms in shape to the pressing face 46 of the pressing member 40 situated closer to the flange 10, and has the side face 26 facing the clamping member that conforms in shape to the pressing face 44 of the pressing member 40 situated closer to the clamping member 30, so that the pressing faces 44 and 46 urge the sealing member 20 against the long object 100 toward to axial center. The number of the sealing members 20, the angles of the slanted faces, the arrangement of the sealing members 20 relative to the pressing members 40 are selected according to desired sealing properties.

<<Clamping Member>>

The clamping member 30 is a cylindrical member disposed around the outer periphery of the long objects 100. The clamping member 30 has a thick part 32 and a thin part 34. The thick part 32 has an inner diameter that is slightly larger than the outer diameter of the long object 100, i.e., equivalent in size to the inner diameter of the small diameter part 14a of the extension part 14, and also has an outer diameter equivalent in size to that of the large diameter part 14b of the extension part 14. The thin part 34, which is situated toward the flange 10, is thinner than the thick part 32. The inner circumferential surface of the thin part 34 has the female thread part 34f configured to be threadably engaged with the male thread part 14bm formed at the tip part of the extension part 14, as illustrated in FIG. 2. Threadable engagement of the clamping member 30 with the extension part 14 causes the sealing members 20 and the pressing members 40 enclosed in the large diameter part 14b of the extension part 14 to be urged toward the stop face 14c. The sealing members 20 are thus compressed in the longitudinal direction of the long object 100 between the stop face 14c and the clamping member 30, thereby exerting an urging force toward the axial center of the long object 100. The outer circumferential surface of the thick part 32 of the clamping member 30 has a plurality of securement holes 36. Rod members (not shown) may be inserted into the securement holes 36 for use as a handle to rotate the clamping member 30.

The clamping member 30 has an inner circumferential surface such that a gap is created between the inner circumferential surface and the outer circumferential surface of the long object 100. This arrangement reduces the risk that a large displacement of the long object 100 in the longitudinal direction causes the long object 100 to slide on the clamping member 30 in the presence of friction. The likelihood of damaging the long object 100 by the clamping member 30 can thus be reduced.

<<Pressing Member>>

The pressing members 40 are annular members disposed around the outer periphery of the long objects 100. The pressing members 40 are interposed between the sealing member 20 and the clamping member 30 or between the neighboring sealing members 20. In this example, two pressing members 40 are used. As illustrated in FIG. 2, the pressing member 40 has the pressing faces 44 and 46 conforming in shape to the side faces 26 and 24 of the sealing members 20, respectively. More specifically, the pressing member 40 interposed between the sealing member 20 and the clamping member 30 has a slanted face whose outer circumferential edge is situated further toward the flange 10 than the inner circumferential edge, and also has a flat face extending in the radial direction and facing toward the clamping member 30. The above-noted slanted face, which conforms in shape to the side face 26 of the sealing member 20 facing toward the clamping member, is the pressing face 44 facing the flange that urges the sealing member 20 toward the axial center of the long object 100. The pressing member 40 interposed between the two sealing members 20 has a slanted face (i.e., the pressing face 44 facing the flange) whose outer circumferential edge is situated further toward the flange 10 than the inner circumferential edge, and also has a slanted face (i.e., the pressing face 46 facing the clamping member) whose outer circumferential edge is situated further toward the clamping member 30 than the inner circumferential edge. The pressing face 44 facing the flange conforms in shape to the clamping-member facing side face 26 of the sealing member 20 situated closer to the flange 10. The pressing face 46 facing the clamping member conforms in shape to the flange facing side face 24 of the sealing member 20 situated closer to the clamping member 30. The number of pressing members 40 and the arrangement of the pressing members 40 relative to the sealing members 20 may be selected in conformity with the sealing members 20.

The pressing members 40 are made of a rigid material that is not elastically deformed upon compression in the longitudinal direction of the long object 100 so as to efficiently urge the sealing members 20 toward the axial center of the long object 100. In this example, the pressing members are made of steel.

The pressing members 40 preferably have an inner circumferential surface such that a gap is created between the inner circumferential surface and the outer circumferential surface of the long object 100. This arrangement reduces the risk that a large displacement of the long object 100 in the longitudinal direction causes the long object 100 to slide on the pressing members 40 in the presence of friction. The likelihood of damaging the long object 100 by the pressing members 40 can thus be reduced.

[Method of Assembling Fluid Sealing Device]

The fluid sealing device 1 described above is assembled by mounting the installation pipe 200 (more specifically, the work pipe 220) to the flange 10, disposing the sealing members 20 and the pressing members 40 between the extension parts 14 (more specifically, the large diameter parts 14b) and the long objects 100, and fastening the clamping members 30.

<<Mounting Flange>>

The core body 12 of the flange 10 is mounted to the end face of the work pipe 220, with the long objects 100 being disposed through the through-holes 14ah of the flange 10. More specifically, the bolts 400, which are inserted through the bolt holes 12bh of the core body 12 and the bolt holes 225h of the projection 225 of the work pipe 220, are threadably engaged with the nuts 500. At this time, the O-ring 600 is disposed between the core body 12 and the projection 225.

<<Disposing Sealing Member and Pressing Member>>

The sealing members 20 and the pressing members 40 are alternately arranged and interposed between the large diameter parts 14b and the long objects 100. In so doing, fitting engagement occurs between the stop face 14c of an extension part 14 and the flange facing side face 24 of a sealing member 20, between the clamping-member facing side face 26 of the sealing member 20 and the flange facing pressing face 44 of a pressing member 40, between the clamping-member facing pressing face 46 of the pressing member 40 and the flange facing side face 24 of another sealing member 20, and between the clamping-member facing side face 26 of such another sealing member 20 and the flange facing pressing face 44 of another pressing member 40, in this order from the side closer to the flange 10.

<<Fastening Clamping Member>>

The female thread parts 34f of the clamping members 30 and the male thread parts 14bm of the extension parts 14 are threadably engaged with each other to fasten the clamping members 30. As a result of fastening, the sealing members 20 are compressed in the longitudinal direction of the long objects 100 at the points of fitting engagement, thereby exerting an urging force toward the axial center of the long objects 100. With this, the assembly of the fluid sealing device 1 is completed.

[Results]

The fluid sealing device 1 described above enables sealing based on an urging force applied toward the axial center of the long objects 100 by the sealing members 20 compressed in the longitudinal direction of the long objects 100. Despite the configuration in which a plurality of long objects 100 are disposed, a compact structure densely arranged in the longitudinal direction and the radial direction of the power cable line enables the sealing of the installation pipe 200 (i.e., the pipe line 210 and the work pipe 220). Further, the fluid sealing device 1 uses the sealing members 20 and the pressing members 40 between the stop faces 14c of the flange 10 and the clamping members 30 such that the clamping members 30 compress the sealing members 20 in the longitudinal direction of the long objects 100. This simple arrangement enables the urging of the sealing members 20 toward the axial centers of the long objects 100, thereby readily enabling the sealing of the installation pipe 200. In particular, the pressing members 40, which are independent of the clamping members 30, are used to compress the sealing members 20, so that the rotational force applied to fasten the clamping members 30 is not exerted on the sealing members 20. This arrangement ensures that only a desired compressive force in the longitudinal direction of the long objects 100 is transmitted to the sealing members 20. Namely, a twisting force is less likely to be applied to the sealing members 20, which improves the reliability of seal between the flange 10 and the long objects 100.

The fluid sealing device 1 has the sealing members 20 disposed between the stop faces 14c and the clamping members 30. Even when the long objects 100 are displaced by a large amount in the longitudinal direction, thus, the sealing members 20 are not moved from their fixed positions. Even when an excessive pressure builds up inside the pipe line 210, for example, the sealing members 20 will not be disengaged by such a pressure. The fluid sealing device 1 is thus preferably used for the purpose of preventing gas leaks when gases are enclosed inside the pipe line 210. Enclosing gases inside the pipe line 210 enables the detection of damage to and the prevention of corrosion of the pipe line 210. Measuring the pressure level of gases enclosed in the pipe line 210 allows damage to the pipe line 210 to be detected based on a drop in the gas pressure, for example. It is thus vitally important to prevent the leaking of gas through the opening 210o of the pipe line 210 (more specifically, from the opening 220o of the work pipe 220) in order to maintain the pressure level of gases inside the pipe line 210 in the normal undamaged state of the pipe line 210.

The fluid sealing device 1 uses sealing created by an urging force of the sealing members 20, which allows the long objects 100 to slide on the sealing members 20 in conformity with the movement of the long objects 100 even when the long objects 100 are displaced by a large amount in the longitudinal direction. This arrangement reduces the risk of damaging the sealing members 20. Gaps are formed between the long objects 100 and other components than the sealing members 20 such as the flange 10, the clamping members 30, and the pressing members 40. Because of this, the sliding movement of these components on the long objects 100 in the presence of friction is unlikely to occur, thereby avoiding the risk of damaging the long objects 100. Namely, the fluid sealing device 1 enables the sliding movement of the long objects 100 when the long objects 100 are displaced by a large amount in the longitudinal direction, and, at the same time, maintains the sealing of the opening 200o of the installation pipe 200 provided by the sealing members 20, while reducing the risk of damaging the long objects 100.

Second Embodiment

A power cable line 2000 according to a second embodiment will be described with reference to FIG. 5 and FIG. 6. The fluid sealing device 1 provided for the power cable line 2000 is similar to the fluid sealing device 1 described in connection with the first embodiment.

Figure 5:
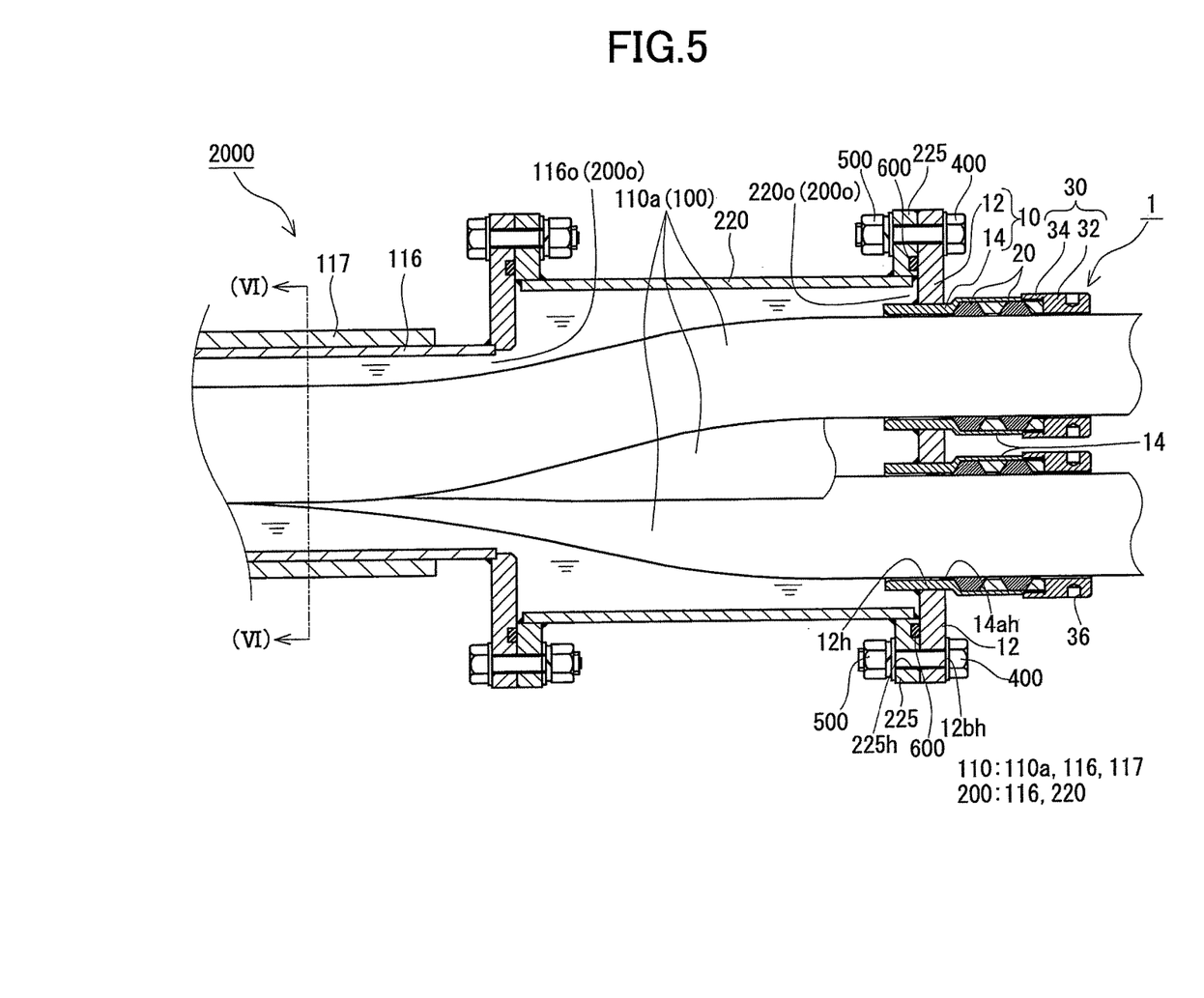
FIG. 5 is a schematic drawing illustrating a fluid sealing device attached to a power cable line according to a second embodiment.
Figure 6:
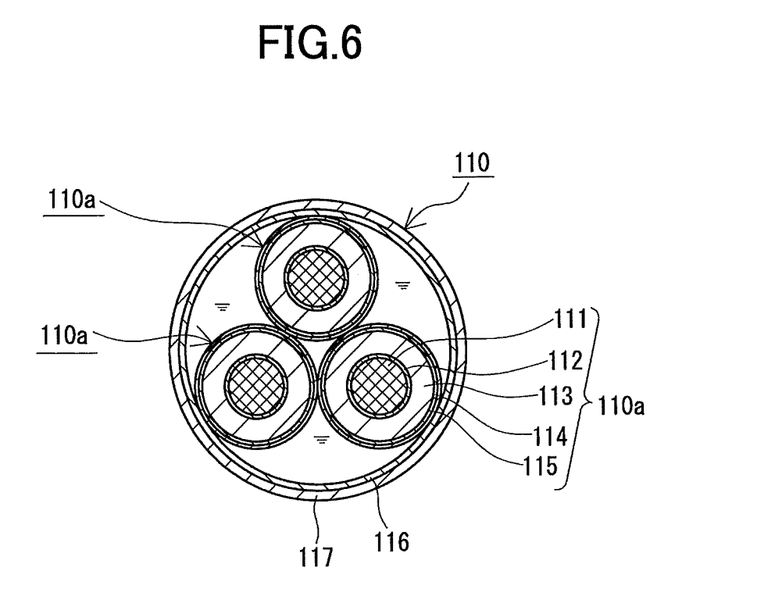
FIG. 6 is a transverse cross-sectional view of long objects and an installation pipe of the power cable line according to the second embodiment.

As illustrated in FIG. 5, the power cable line 2000 of the second embodiment includes cable cores 110a serving as long objects 100, a metal sheath 116 and a work pipe 220 serving as an installation pipe 200 having the cable cores 110a installed therein, and the fluid sealing device 1 for sealing an opening 116o of the metal sheath 116 via the work pipe 220. In this example, the three cable cores 110a are twisted together to be installed in the metal sheath 116. The work pipe 220 having a larger diameter to provide a sufficient space for unfolding the twisted cable cores 110a is disposed at the end of the metal sheath 116 for the purpose of allowing the cable cores 110a to be separately guided from the metal sheath 116. Each of the metal sheath 116 and the work pipe 220 has a flange disposed at the end thereof on the outer side away from the axial center. Bolt holes are formed through the flanges. Bolts inserted through the bolt holes of the two flanges are threadably engaged with nuts, thereby integrating the metal sheath 116 and the work pipe 220 into one piece. An O-ring is disposed between the flanges. The power cable line 2000 of the second embodiment is configured such that the long objects 100 (i.e., the cable cores 110a) and the metal sheath 116 together constitute a power cable 110, which is buried under the ground.

Each of the cable cores 110a, which have the same configuration, includes, from interior to exterior, a conductive body 111, an inner semi-conductive layer 112, an insulating body 113, an outer semi-conductive layer 114, and a bedding tape 115. Liquid coolant fills the gap between the cable cores 110a and the metal sheath 116 in order to cool the cable cores 110a. An anticorrosion layer 117 is disposed directly on the surface of the metal sheath 116.

The fluid sealing device 1 enables the sliding movement of the long objects 100 (i.e., cable cores 110a) when the long objects 100 are displaced by a large amount in the longitudinal direction, and, at the same time, maintains the seal of the opening 200o of the installation pipe 200 (more specifically, the opening 220o of the work pipe 220) provided by the sealing members 20 while reducing the risk of damaging the long objects 100. The seal of the opening 116o of the metal sheath 116 via the work pipe 220 by use of the fluid sealing device 1 prevents the liquid coolant from leaking to the outside.

Third Embodiment

A power cable line 3000 of a third embodiment will be described with reference to FIG. 7. The fluid sealing device 1 provided for the power cable line 3000 is similar to the fluid sealing device 1 described in connection with the first embodiment.

Figure 7:
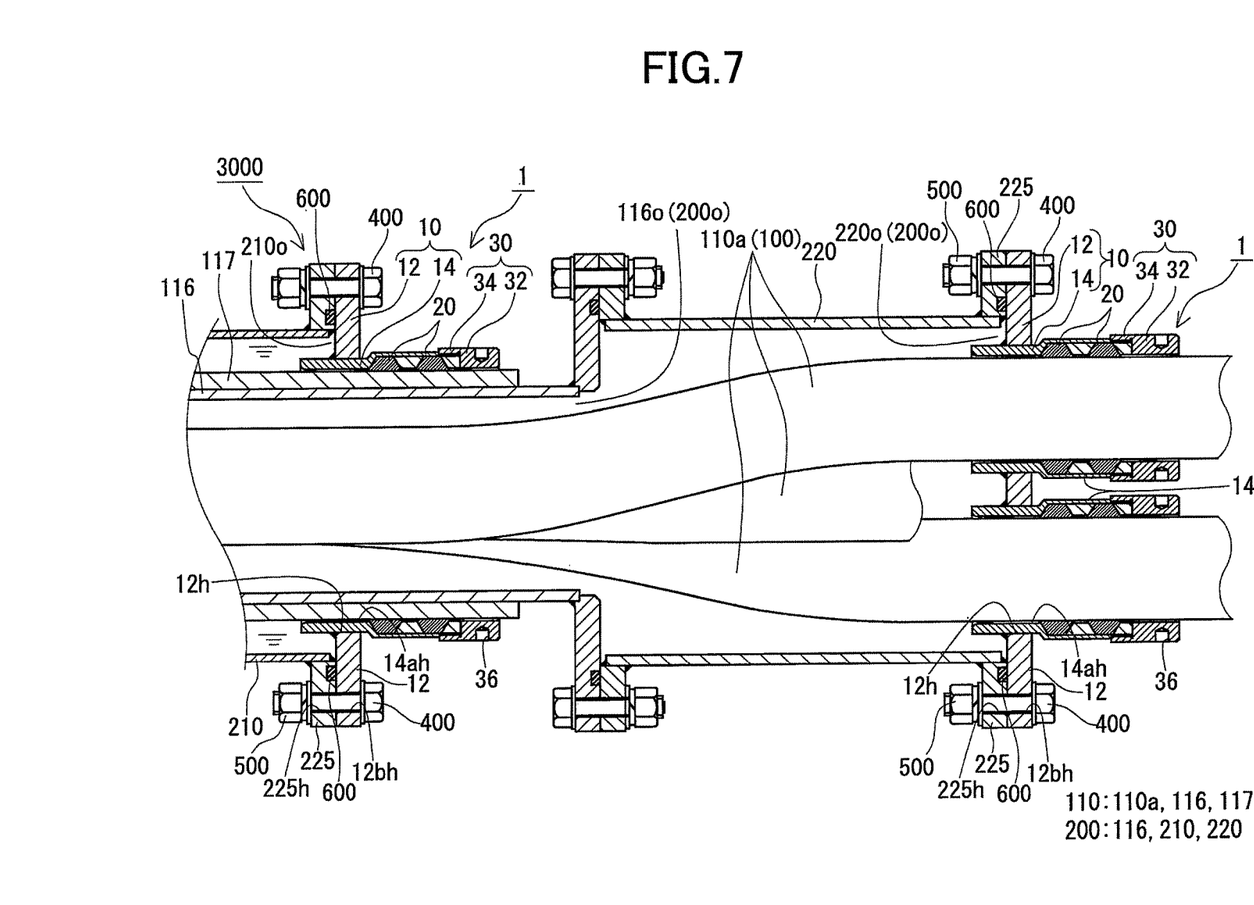
FIG. 7 is a schematic drawing illustrating a fluid sealing device attached to a power cable line according to a third embodiment.

As illustrated in FIG. 7, the power cable line 3000 of the third embodiment includes cable cores 110a serving as long objects 100, a metal sheath 116 and a work pipe 220 serving as an installation pipe 200, within which the cable cores 110a are installed, and the fluid sealing device 1 for sealing an opening 116o of the metal sheath 116 via the work pipe 220. In this configuration, the long objects 100 (i.e., cable cores 110a) and the metal sheath 116 together constitute a power cable 110, as in the case of the second embodiment. The power cable line 3000 of the third embodiment is configured such that the power cable 110 is enclosed in the pipe line 210, with liquid coolant filling the gap between the power cable 110 and the pipe line 210 in order to absorb heat from the power cable 110. The power cable line 3000 of the third embodiment includes the pipe line 210 (i.e., installation pipe 200) having the power cable 110 (including the long objects 100) installed therein, and also includes an additional fluid sealing device 1 that seals the opening 210o of the pipe line 210. The fluid sealing device 1 that seals the opening 210o of the pipe line 210 is mounted to the metal sheath 116 (more specifically, to the anticorrosion layer 117), which eliminates the need for a work pipe.

The fluid sealing device 1 (i.e., the fluid sealing device 1 illustrated on the right-hand side of FIG. 7), which seals the opening 116o of the metal sheath 116, serves to prevent, among other things, water from entering the metal sheath 116 and to prevent gases from leaking, for example, in the case of gases being enclosed inside the metal sheath 116. The fluid sealing device 1 (i.e., the fluid sealing device 1 illustrated on the left-hand side of FIG. 7), which seals the opening 210o of the pipe line 210, serves to prevent the liquid coolant inside the pipe line 210 from leaking to the outside.

Fourth Embodiment

A power cable line 4000 of a fourth embodiment will be described with reference to FIG. 8. The fluid sealing device 1 provided for the power cable line 4000 is similar to the fluid sealing device 1 described in connection with the first embodiment.

Figure 8:
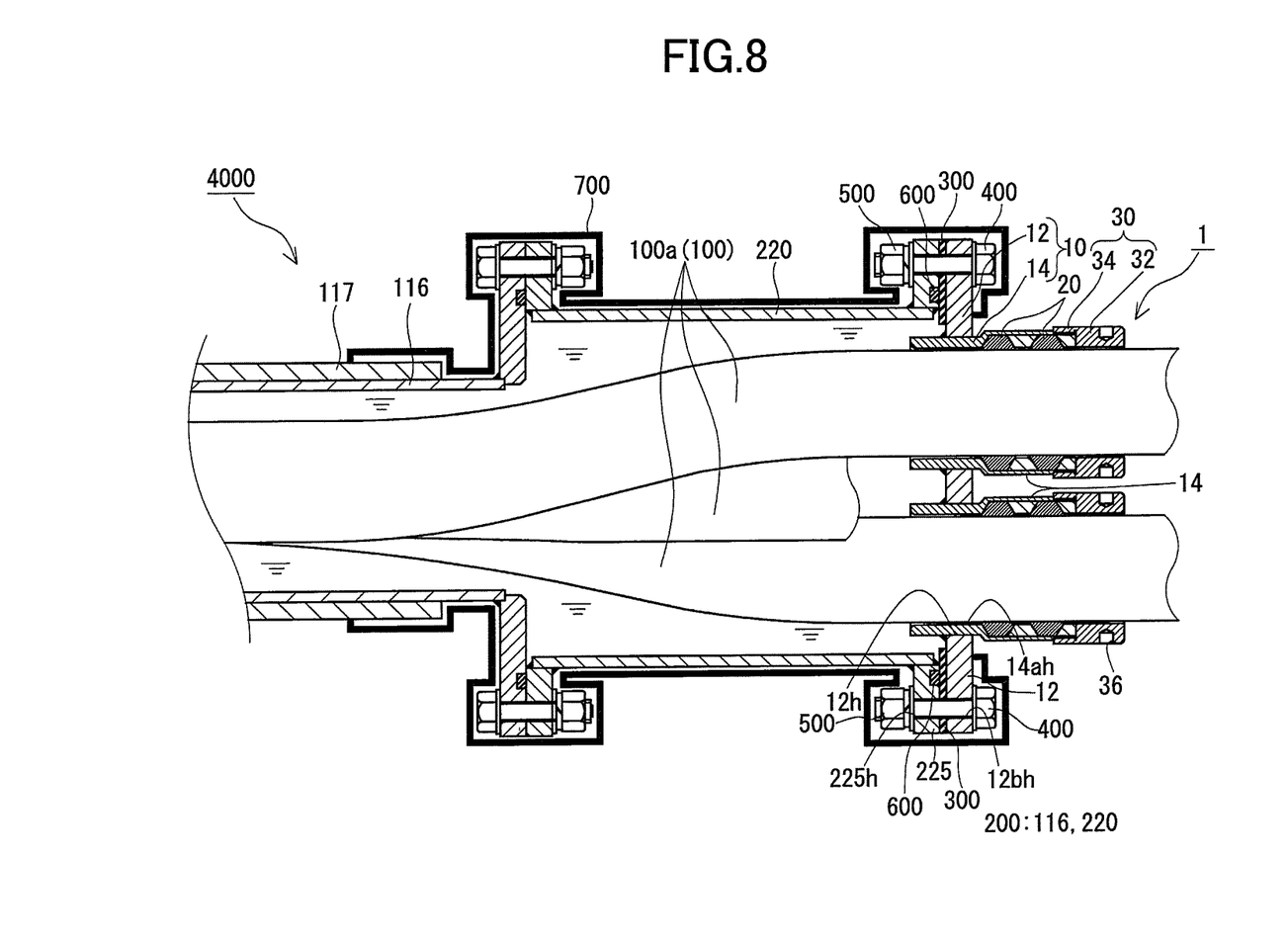
FIG. 8 is a schematic drawing illustrating a fluid sealing device attached to a power cable line according to a fourth embodiment.

As illustrated in FIG. 8, the power cable line 4000 of the fourth embodiment includes cable cores 110a serving as long objects 100, a metal sheath 116 and a work pipe 220 serving as an installation pipe 200 having the cable cores 110a installed therein, and the fluid sealing device 1 for sealing an opening 116o of the metal sheath 116 via the work pipe 220. In this configuration, the long objects 100 (i.e., cable cores 110a) and the metal sheath 116 together constitute a power cable 110 as in the case of the second embodiment. An anticorrosion layer 117 is disposed directly on the surface of the metal sheath 116. The power cable line 4000 of the fourth embodiment includes an insulating plate 300 interposed between the perimeter of the flange 10 of the fluid sealing device 1 and the projection 225 disposed at the end of the work pipe 220 (i.e., at the end of the installation pipe 200). In this example, the insulating plate 300 is an annular plate. Bolts 400 passing through the bolt holes 12bh of the flange 10 and the bolt holes 225h of the projection 225 are insulating bolts. Namely, the flange 10 of the fluid sealing device 1 and the work pipe 220 (i.e., the installation pipe 200) are electrically insulated from each other in the power cable line 4000 of the fourth embodiment. This arrangement allows protective current to be conducted through the metal sheath 116, thereby preventing corrosion of the metal sheath 116. By covering an area extending from the core body 12 of the flange 10 to the anticorrosion layer 117 disposed directly on the metal sheath 116 with an anticorrosion member 700 made of an insulating material, the flange 10 and the installation pipe 200 may be reliably insulated. Water, which may come in contact with the extension parts 14 (or flange 10) or clamping members 30 of the fluid sealing device 1, is thus less likely to affect the metal sheath 116. In FIG. 8, a gap is shown between the anticorrosion member 700 and the members covered with the anticorrosion member 700 for the sake of clearer illustration, but no gap exists in reality. The anticorrosion member 700 may be formed by disposing an insulating tube, such as a thermal contraction tube, or by applying an insulating coating material such as polyethylene resin.

The present invention is not limited to those embodiments and examples, and is intended to include any variations and modifications which may be made without departing from the scope of the claims and from the scope warranted for equivalents of the claimed scope. For example, the numbers and shapes of sealing members and pressing members may be modified as appropriate.

The present application is based on and claims the benefit of priority of Japanese priority application No. 2017-014905 filed on Jan. 30, 2017, with the Japanese Patent Office, the entire contents of which are hereby incorporated by reference.

What is claimed is:

1. A fluid sealing device for sealing an opening of an installation pipe in which at least a long object is installed, comprising:
    a flange including a flat planar plate and a hollow cylindrical extension part, the flat planar plate configured to close the opening of the installation pipe, the flat planar plate having a hole penetrating therethrough from which the hollow cylindrical extension part extends perpendicularly to the flat planar plate, the hollow cylindrical extension part having the long object passing therethrough, and an inner surface of the hollow cylindrical extension part having a stop face that is a step between different inner diameters;
    one or more sealing members configured to be disposed on an outer periphery of the long object and configured to exert an urging force toward an axial center of the long object upon being compressed in an axial direction of the long object, thereby sealing a gap between the flange and the long object;
    a clamping member configured to press the one or more sealing members toward the stop face; and
    one or more pressing members interposed between the one or more sealing members and the clamping member around the outer periphery of the long object, the one or more pressing members configured to press a second side face of the one or more sealing members facing toward the clamping member, the one or more pressing members being sandwiched and clamped, substantially without a gap in a direction in which the long object extends, between the clamping member and the one or more sealing members.

2. The fluid sealing device as claimed in claim 1, wherein the hollow cylindrical extension part extends toward an outside of the installation pipe in the axial direction of the long object and is configured to accommodate the one or more sealing members therein.

3. The fluid sealing device as claimed in claim 2, wherein the hollow cylindrical extension part has a male thread part formed at a tip thereof, and the clamping member has a female thread part configured to be threadably engaged with the male thread part.

4. The fluid sealing device as claimed in claim 1, wherein the one or more sealing members have a first side face facing toward the flat planar plate and having an inner circumferential edge thereof situated further toward the flat planar plate than an outer circumferential edge thereof, and the stop face conforms in shape to the first side face.

5. The fluid sealing device as claimed in claim 1, wherein the one or more pressing members have an inner circumferential surface such that a gap is created between the inner circumferential surface and an outer circumferential surface of the long object.

6. The fluid sealing device as claimed in claim 1, wherein the clamping member has an inner circumferential surface such that a gap is created between the inner circumferential surface and an outer circumferential surface of the long object.

7. A power cable line, comprising:
a long object having a cable core contained therein;
an installation pipe having the long object installed therein;
a fluid sealing device that seals an opening of the installation pipe, wherein the fluid sealing device includes:
a flange configured to close the opening of the installation pipe, the flange having a hole through which the long object is made to pass, and the flange having a stop face that is continuous with and at an angle to an inner surface of the hole;
one or more sealing members configured to be disposed on an outer periphery of the long object and configured to exert an urging force toward an axial center of the long object upon being compressed in an axial direction of the long object, thereby sealing a gap between the flange and the long object; and
a clamping member configured to press the one or more sealing members toward the stop face; and
an insulating plate interposed between a periphery of the flange of the fluid sealing device and an end of the installation pipe; and
one or more insulating bolts passing through the flange and the insulating plate to fasten the flange and the insulating plate to each other.

8. The fluid sealing device as claimed in claim 1, wherein the one or more sealing members are two or more sealing members, and the one or more pressing members are two or more pressing members alternating with the two or more sealing members in the axial direction of the long object, and
wherein the two or more sealing members are configured to be pressed in the axial direction of the long object by the two or more pressing members to exert an urging force toward an axial center of the long object, thereby preventing the long object from sliding in the axial direction thereof relative to the two or more sealing members.

* * * * *